United States Patent [19]
Liu et al.

[11] Patent Number: 6,007,728
[45] Date of Patent: Dec. 28, 1999

[54] DESIGN OF A NOVEL TACTILE SENSOR

[75] Inventors: Lian Jun Liu; Mnoon Yan Loke; Pang Dow Foo, all of Singapore, Singapore

[73] Assignee: Institute of Micoelectronics, Singapore, Singapore

[21] Appl. No.: 08/961,126

[22] Filed: Oct. 30, 1997

[30] Foreign Application Priority Data

Aug. 14, 1997 [SG] Singapore ............................ 9702938-3

[51] Int. Cl.$^6$ .................................................. B44C 1/22
[52] U.S. Cl. ................... 216/2; 73/862.337; 73/862.381; 216/39; 216/79
[58] Field of Search .................................. 216/2, 39, 79; 73/862.337, 862.381, 862.451, 862.473, 862.625

[56] References Cited

U.S. PATENT DOCUMENTS

| | | |
|---|---|---|
| 4,481,815 | 11/1984 | Overton . |
| 4,614,119 | 9/1986 | Zavracky et al. ........................ 216/2 X |
| 4,808,549 | 2/1989 | Mikkor et al. ........................... 216/2 X |
| 5,616,514 | 4/1997 | Muchow et al. ........................ 216/2 X |
| 5,683,546 | 11/1997 | Manaka ....................................... 216/2 |

FOREIGN PATENT DOCUMENTS

| | | |
|---|---|---|
| 0 121 904 | 10/1984 | European Pat. Off. . |
| 0 125 895 | 11/1984 | European Pat. Off. . |

Primary Examiner—William Powell
Attorney, Agent, or Firm—Proskauer Rose LLP

[57] ABSTRACT

An apparatus for sensing an applied force comprising a deflectable bridge, formed in a substrate and spanning a recessed area. The deflectable bridge also has a sensing element. The force is applied to the bridge and in response thereto, an output characteristic of the sensing element changes in proportion to the magnitude of the applied force. The apparatus can further comprise a sensing bump in contact with the bridge, wherein the force is applied to the bridge through the sensing bump.

30 Claims, 3 Drawing Sheets

DESIGN OF A NOVEL TACTILE SENSOR

FIELD OF THE INVENTION

This invention relates to the design and fabrication of a tactile sensor.

BACKGROUND OF THE INVENTION

The need for high quality, low cost, and high productivity in industrial manufacturing and processing demands an increase in the use of automation and the utilization of robots. For an automated process, such as a manufacturing robot, to operate correctly in a given environment, the robot should have a means of determining information about the surrounding environment. For instance, an automated riveting machine on an assembly line should be able to compensate for positional variances in the object that is to be riveted and be able to determine the correct amount of force to apply to place and pop a rivet.

To enable automated processes (e.g., robots) to make determinations about a given environment, the robot should have sensors that are able to sense specific aspects of that environment. For a robotic riveter, the riveter should have sensors that determine the positioning of an object that is to be riveted. In the case where the positioning is improper, there should be further systems (e.g., feedback systems) that use the sensor data to compensate for the positional variations either by repositioning the object that is to be riveted or by repositioning the riveter.

For a sensor to effectively operate in a dynamic environment like an assembly line, the sensor should be able to differentiate between more than just a bi-level state as in an "on" or "off" condition. The sensor should be able to differentiate between graded inputs such as variations in an applied force.

A tactile sensor is a, type of sensor that is widely used in automated industrial processes. A tactile sensor detects a given parameter (e.g., pressure) by actually coming into contact with the object or environment that it is detecting. Tactile sensors may be used to measure not only force but also force distribution and surface texture of objects as the objects come in contact with a piece of automation such as a robotic arm. The tactile sensors may provide the robotic arm with a sense of touch and therefore enable such functions as determining the magnitude of an applied force, determining part orientation, identifying parts, sorting of parts, retrieval of parts (e.g., from a storage bin), etc. Precision tactile sensors may be utilized in numerous other applications. For instance, in the health care field, tactile sensors can be used in devices such as prosthetic gloves for the handicapped to in effect, give the prosthetic glove a sense of touch.

A good tactile sensor should have a high resolution to make determinations about small variations in measured parameters. The sensor should be scalable to enable appropriate sizing of the sensor for a given task. For instance, groups of sensors should be able to be manufactured in a high density so that variations in a sensed parameter can be determined over a small area. The tactile sensor should have a fast response time to enable rapid determinations in a changing environment. Further, the tactile sensor should be stable so that a given sensed parameter, such as an applied force, can be reliably determined.

There are a variety of tactile sensors that are known in the prior art. One prior art tactile sensor uses conductive elastomers as a sense element. The conductive elastomers change resistance when compressed by an applied force. Conductive elastomers cannot be formed as part of a CMOS fabrication process and therefore are not capable of being integrated with on-chip CMOS signal processing. A better approach uses a piezoelectric film as the sense element These tactile sensors utilize a diaphragm as a sensing element, and are relatively simple and inexpensive to fabricate. However, piezoelectric film sensors have poor stability and are difficult to scale to smaller dimensions.

Some other tactile sensors utilize semiconductor integrated circuit ("IC") technology. IC tactile sensors may use a resistive or capacitive device as a sense element. These devices may, for instance, be fabricated using a wet chemical etching of a silicon or polysilicon to form a piezoresistor. Although some prior art methods offer high performance (e.g. stability), most of the methods do not lend themselves easily to large, high resolution arrays since the minimum size of a single sensing cell is too large for very dense applications.

Prior art tactile sensors may not be reliable or stable because a response to a force applied to a sensing cell may vary depending on where, with respect to the sensing cell, the force is applied. This affects the accuracy of the prior art tactile sensors.

Therefore, it is an object of the present invention to utilize a method of manufacturing a tactile sensor, wherein said manufacturing process is simple and inexpensive.

Another object of this invention is to provide a method of manufacturing a tactile sensor that results in a sensor that exhibits a high degree of reliability and stability.

A further object of this invention is to provide a method of manufacturing a plurality of tactile sensors in an integrated circuit, wherein said plurality of sensors may be densely placed together or otherwise appropriately sized and spaced.

A still further object of this invention is to provide an improved sensor that exhibits a high degree of resolution.

A yet further object of this invention is to provide an improved sensor that is reliable, stable and can accurately determine the magnitude of an applied force.

SUMMARY OF THE INVENTION

These and other objects are achieved by a tactile sensor fabricated in accordance with the method of the present invention, as disclosed herein. A sensing cell according to a preferred embodiment of the present invention is comprised of a silicon bridge spanning a recessed area. A sensing element (e.g., a piezoresistor) and a sensing bump are preferably fabricated on the silicon bridge.

In operation, if a pushing force is applied to the sensing bump, the bridge will respond by being deflected into the recessed area. The degree of deflection of the bridge, alters an output characteristic (e.g., resistance) of the sensing element (e.g., a piezoresistor) in a, predictable manner. The change in the output characteristic of the sensing element is proportional to the magnitude of the applied force. Therefore, the magnitude of the applied force can readily be determined. For instance, in the case where the sensing element is a piezoresistor, the resistance of the piezoresistor changes due to the deflection of the bridge, and the deflection of the piezoresistor fabricated thereon. The change in resistance of the piezoresistor is in proportion to the magnitude of the applied force.

The sensing bump is fabricated on the bridge to increase the likelihood that the sensing bump will receive the applied force. The sensing bump is preferably narrower than the bridge and is preferably centered on a center longitudinal axis of the bridge to make it more likely that a force which is applied to the sensing cell will be applied closer to the center longitudinal axis of the bridge. This force is preferably applied closer to the center longitudinal axis to increase the reliability of the tactile sensor.

Any force that is applied to the bridge, which is removed from the center longitudinal axis of the bridge, will produce a resultant flexing force and a resultant torsional force. The resultant flexing force tends to deflect the bridge into the recessed area. The resultant torsional force tends to twist the bridge. The magnitude of the resultant forces (the flexing and the torsional force) will vary for an applied force that has a fixed magnitude, depending on how far from the center longitudinal axis of the bridge, the force is applied.

As the force is applied further from the center longitudinal axis of the bridge, the resultant flexing force decreases and the resultant torsional force increases. As the force is applied closer to the center longitudinal axis of the bridge, the resultant flexing force increases and the resultant torsional force decreases. The flexing force may affect the sensing element differently than the torsional force. So, as the magnitude of the resultant forces varies for a given applied force, due to the placement of the applied force with respect to the center longitudinal axis of the bridge, the response from the sensing element may also vary. Therefore, a fixed applied force may produce a change in the output characteristic of the sensing element that is not only dependent on the magnitude of the applied force, but is also dependent on the location of the applied force.

Since the sensing bump is higher than the bridge, is narrower than the bridge, and is centered on the center longitudinal axis of the bridge, the sensing bump increases the likelihood that the force may be applied closer to the center longitudinal axis of the bridge. Applying the force closer to the center longitudinal axis of the bridge tends to increase the magnitude of the resultant flexing force and tends to decrease the magnitude of the resultant torsional force. This produces a more consistent change in the output characteristic of the sensing element in response to an applied force. Therefore, the sensing bump tends to make the apparatus of the present invention more accurate, reliable and stable.

In another preferred embodiment, a plurality of piezoresistors (e.g., the sensing element) can be arranged in a Wheatstone bridge circuit configuration. In this configuration, the change in the output characteristic of the plurality of piezoresistors (e.g., change in resistance), due to the deflection of the bridge, produces a change in an output voltage of the Wheatstone bridge circuit. This change in the output voltage of the Wheatstone bridge circuit is in proportion to the magnitude of the applied force. Therefore, the magnitude of the applied force can be determined.

The Wheatstone bridge circuit improves the sensitivity of the tactile sensor since the Wheatstone bridge circuit is a balanced resistor configuration in which a small change in resistance of the plurality of piezoresistors (due to the deflection of the bridge), produces a proportionate and larger change in the output voltage of the Wheatstone bridge circuit. This larger change in the output voltage of the Wheatstone bridge circuit is more readily measured than the smaller change in the resistance of a single piezoresistor. This is especially true when the amount of deflection of the bridge is relatively small (e.g., in response to a small applied force).

The tactile sensor of the present invention may also be arranged in a sensing array, wherein a plurality of sensing cells are scaled and spaced according to a desired application. For instance, in an application where a robot needs to determine the texture of an object, a dense array of sensing cells may be required.

To determine the output characteristic of each of the sensing cells in the plurality of sensing cells, an addressing circuit may be used to selectively address each sensing cell. A signal processing unit (e.g., a microprocessor) may be used to control the addressing circuit and to determine the change in the output characteristic of each of the sensing elements in the plurality of sensing cells.

In a sensing array, one or more of the sensing elements in the plurality of sensing cells, may be affected by the applied force. If none of the sensing elements in the plurality of sensing cells is affected by an applied force, then no force is sensed by the sensing array.

The tactile sensor of the present invention is highly scalable and can be fabricated to a desired size and sensor density. The tactile sensor according to the present invention, unlike some of the prior art tactile sensors, can be scaled, if necessary, to provide a dense sensor array. Further, the tactile sensor of the present invention is more stable than prior art sensors and can accurately measure an applied force.

The sensing bump of the present invention eliminates many of the sensing errors that occur in prior art tactile sensors due to variations in the placement of the force with relation to the sensor (as discussed above). The tactile sensor of the present invention is compatible with standard CMOS processing and therefore can readily be integrated onto an IC which includes the sensor circuitry (e.g., a sensor array) and any required controller circuitry (e.g., an addressing circuit and a signal processing unit). The tactile sensor fabricated according to the present invention exhibits a high sensitivity, has a high resolution, is stable, has a fast response time and is capable of being readily fabricated on an integrated circuit with on-chip CMOS signal processing circuitry.

BRIEF DESCRIPTION OF THE DRAWINGS

The following is a description of preferred embodiments of the present invention, that when taken in conjunction with the following drawings will demonstrate the above-noted features and advantages as well as further ones. It should be expressly understood that the drawings are included for illustrative purposes and do not represent the scope of the present invention. The invention will be best understood in conjunction with the accompanying drawings in which.

DETAILED DESCRIPTION OF THE INVENTION

Figure 1A:
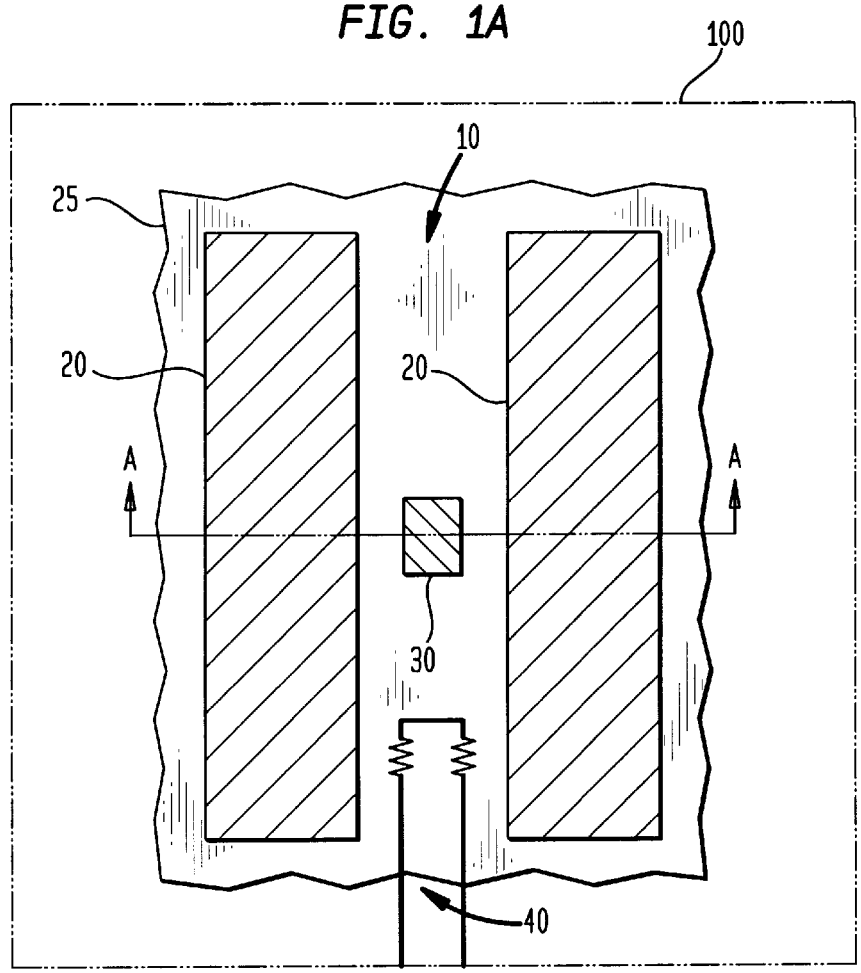
FIGS. 1A and 1B are respectively an overhead and a cross-sectional view of a sensing cell of a tactile sensor according to a preferred embodiment of the present invention.
Figure 1B:
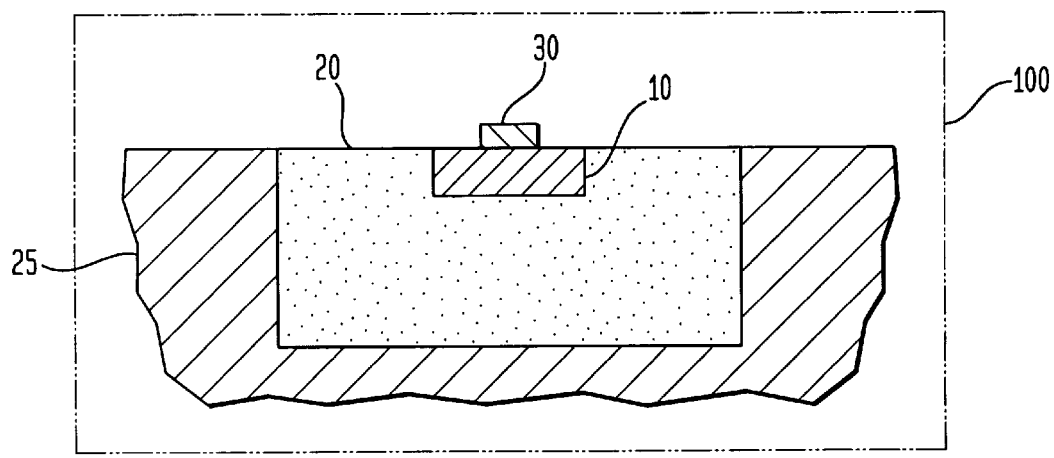

In the drawings, like reference numbers are used to designate like parts. FIGS. 1A and 1B show a tactile sensor according to a preferred embodiment of the present invention. FIG. 1B is a cross-sectional view of the tactile sensor, taken along a cross-section A—A shown in FIG. 1A.

Tactile Sensing Cell

A preferred embodiment of a tactile sensor is comprised of a single sensing cell 100, further comprised of a silicon bridge 10 spanning a recessed area 20. The bridge 10 is formed by an etching and undercutting process (discussed below) which releases the bridge 10 from the silicon in a surrounding area 25. A sensing bump 30 is formed on the bridge as is a sensing element 40 (e.g., a piezoresistor).

In operation, an output characteristic (e.g., the resistance) of the sensing element 40, without an applied force, is measured and stored. Thereafter, a force is applied to the sensing bump 30 (e.g., in response to the sensing bump 30 coming into contact with an object). The force is transmitted through the sensing bump 30 to the bridge 10 causing the bridge 10 to be deflected towards the recessed area 20. The deflection of the bridge 10 affects the sensing element 40 by changing the mobility of the electrons on the bridge 10, thereby causing a change in the output characteristic of the sensing element 40. This change in the output characteristic of the sensing element 40 is proportional to the amount that bridge 10 is deflected, which in turn, is proportional to the magnitude of the force applied to the sensing bump 30. Therefore, by measuring the change in the output characteristic of the sensing element 40, the magnitude of the force applied to the sensing bump 30 can be determined.

Illustratively, for a point loading system with the applied force concentrated in the sensing bump 30, the stress seeded by the sensing element 40 is:

$$\sigma_x = \frac{3Pl}{4bt^2}$$

where p=loading force l=length of the bridge b=width of the bridge t=thickness of the bridge $\sigma_x$=stress in the x (e.g., up/down) direction For the above applied loading force with the resultant stress $\sigma_x$ generated, the relative change in resistance of a piezoresistor sensing element is:

$$\frac{\Delta R}{R} = \frac{1}{2}\pi_{44}\sigma_x$$

$\pi_{44}$=where piezoresistance coefficient.

The sensing bump 30 is preferably elevated above the surface of the bridge 10 to increase the likelihood that a force applied to sensing cell 100, will come into contact with the sensing bump 30 instead of the perimeter of the bridge 10. Further, since the sensing bump. 30 is preferably narrower than the bridge 10 and is preferably centered on a center longitudinal axis B—B of the bridge 10, shown in FIG. 2, the sensing bump 30 increases the likelihood that an applied force, which comes into contact with the sensing cell 100 (e.g., an object contacting the sensing cell 100), will be concentrated closer to the center longitudinal axis B—B of the bridge 10.

Preferably, the applied force is concentrated on the center longitudinal axis B—B of the bridge 10 because this primarily results in a flexing force being applied to the bridge 10 (e.g., a force which deflects the bridge into the recessed area 20). It is this force that deflects the bridge and preferably changes the output characteristic (e.g., resistance) of the sensing element 40.

Applying a force directly to the bridge 10, at a point removed from the center longitudinal axis B—B of the bridge 10, results in both a flexing force and a torsional (twisting) force. The magnitude of the flexing and torsional forces vary depending on where, with respect to the center longitudinal axis B—B of the bridge 10, the force is applied. As the force is applied further from the center longitudinal axis B—B of the bridge 10, the flexing force decreases and the torsional force increases. As the force is applied closer to the center longitudinal axis B—B of the bridge 10, the flexing force increases and the torsional force decrease.

The effect of each of these resultant forces (e.g., the flexing and torsional forces) on the sensing element 40 varies depending on the relative magnitude of each resultant force. Therefore, the affect that an applied force will have on the bridge 10 varies depending on the location of the applied force. The more that the resultant forces vary (e.g., by varying the location of the force applied to the bridge 10), the more difficult it is to determine the magnitude of the applied force.

Since the sensing bump 30 is preferably narrower than the bridge 10 and centered on the center longitudinal axis B—B of the bridge 10, a force that comes into contact with the sensing bump 30 is more likely to be applied closer to the center longitudinal axis B—B of the bridge 10 than if the force were applied directly to the bridge 10. Therefore, the applied force will more likely result in a larger flexing force and a smaller torsional force which optimizes the deflection of the bridge 10 and helps minimize the fluctuation of the sensing element 40 to the applied force. The optimization of the deflection of the bridge 10 makes the sensing cell 100 more reliable, stable and accurate.

The sensing bump 30 may be formed by a metal, polysilicon, dielectric and passivation layers, or any combination thereof. These layers may be formed during normal CMOS processing concurrent with the forming of any peripheral sensor circuitry (discussed below). The sensing element 40 (e.g., a piezoresistor) may be formed by P+ implantation also during standard CMOS processing.

The bridge 10 may be formed at the last processing stage by using well known etching and undercutting processes on the silicon in the surrounding area 25. The etching and undercutting processes are continued until the bridge 10 is released and the recessed area 20 is formed.

A plurality of piezoresistors can alternatively be used as the sensing element 40. The plurality of piezoresistors -may be arranged as a Wheatstone bridge circuit. The Wheatstone bridge circuit provides a voltage as an output signal (e.g., the output characteristic of the sensing element 40). With a Wheatstone bridge circuit as the sensing element 40, a force applied to the sensing cell 100 results in a proportional change in the output voltage of the Wheatstone bridge circuit.

The plurality of piezoresistors of the Wheatstone bridge circuit operate as a balanced resistor network. Any small variation in the resistance of the plurality of piezoresistors, results in a larger and proportional change in the output voltage of the Wheatstone bridge circuit. Therefore, the use of the Wheatstone bridge circuit for the sensing element 40, improves the sensitivity of the sensing cell 100 over a sensing cell 100 that uses a single piezoresistor as a sense element 40.

In another alternate embodiment, the sensing element 40 can be a MOS transistor.

Figure 2:
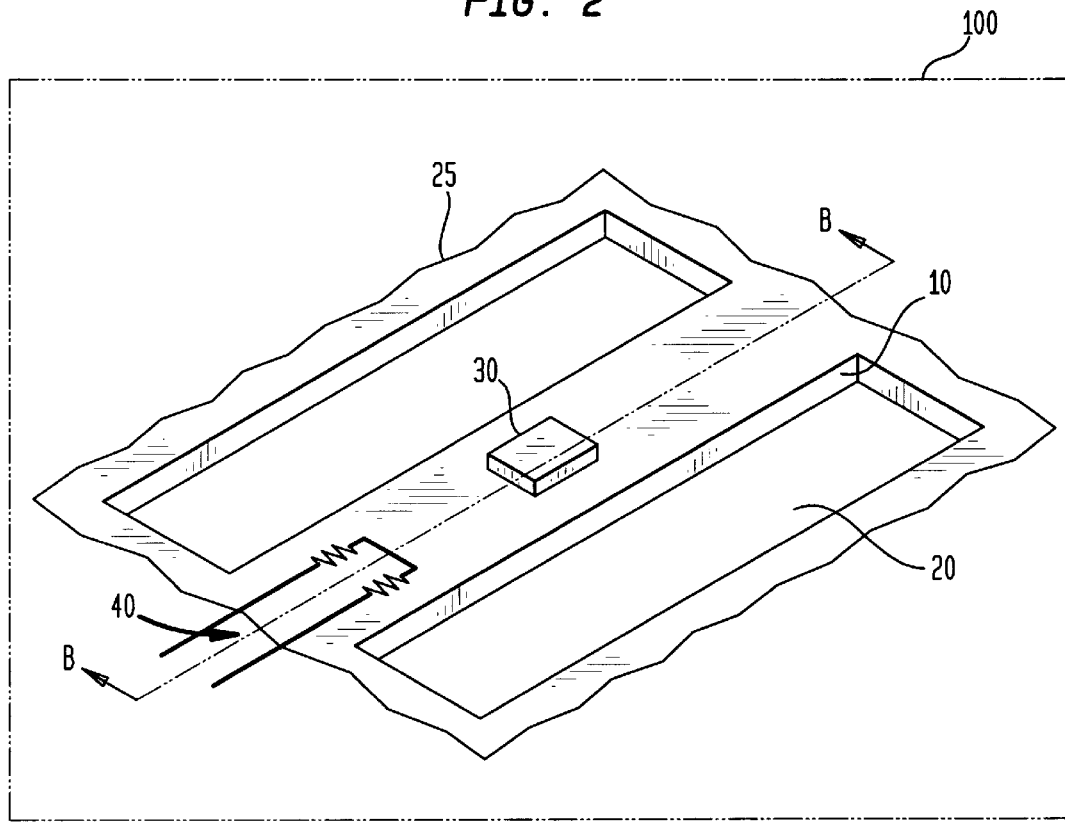
FIG. 2 is a perspective view of a sensing cell according to a preferred embodiment of the present invention.
Figure 3:
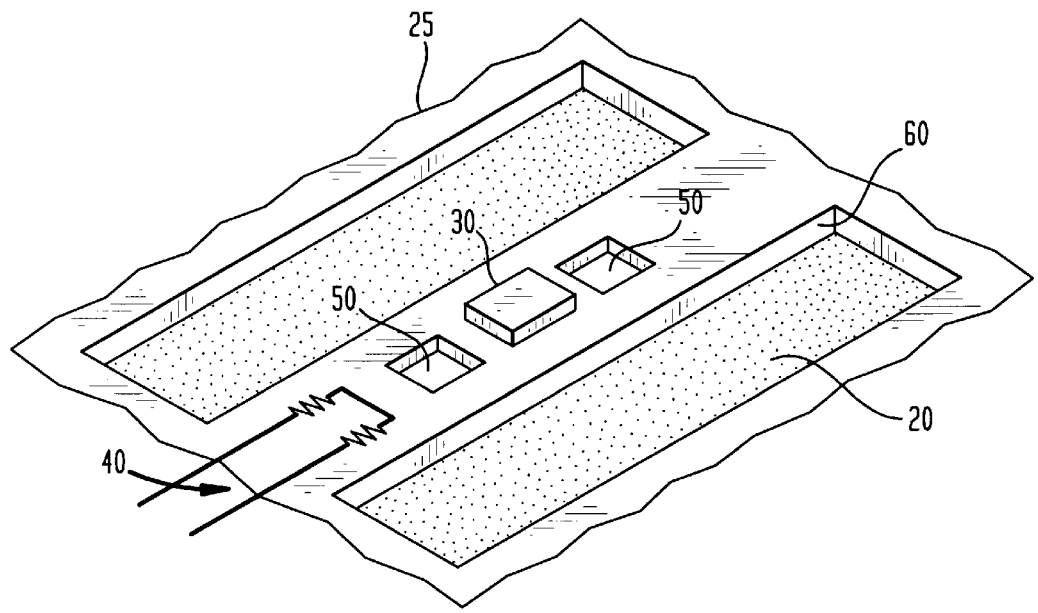
FIG. 3 is an alternate embodiment for the tactile sensor of the present invention.

Furthermore, the structure to which the force is applied is not restricted to a "simple" bridge 10 as shown in FIGS. 1 and 2. In FIG. 3 is shown a modified bridge 60, which has alterations such as middle openings 50. The middle openings 50 may be formed by a known boring process by boring through the modified bridge 60, from a first surface of the modified bridge 60, to a second surface of the modified bridge 60. The middle openings 50 improve the ease of the etching process of the area 25 surrounding the modified bridge 60 by providing more access to the underside of the modified bridge 60. The modified bridge 60 also improves the sensitivity of the sensing cell 100 by producing a larger deflection in the modified bridge 60, in response to an applied force. The larger deflection of the modified bridge 60 produces a larger change in the output characteristic (e.g., the resistance) of the sensing element and therefore makes the sensing cell 100 more sensitive to the applied force.

Tactile Sensing Array

Figure 4:
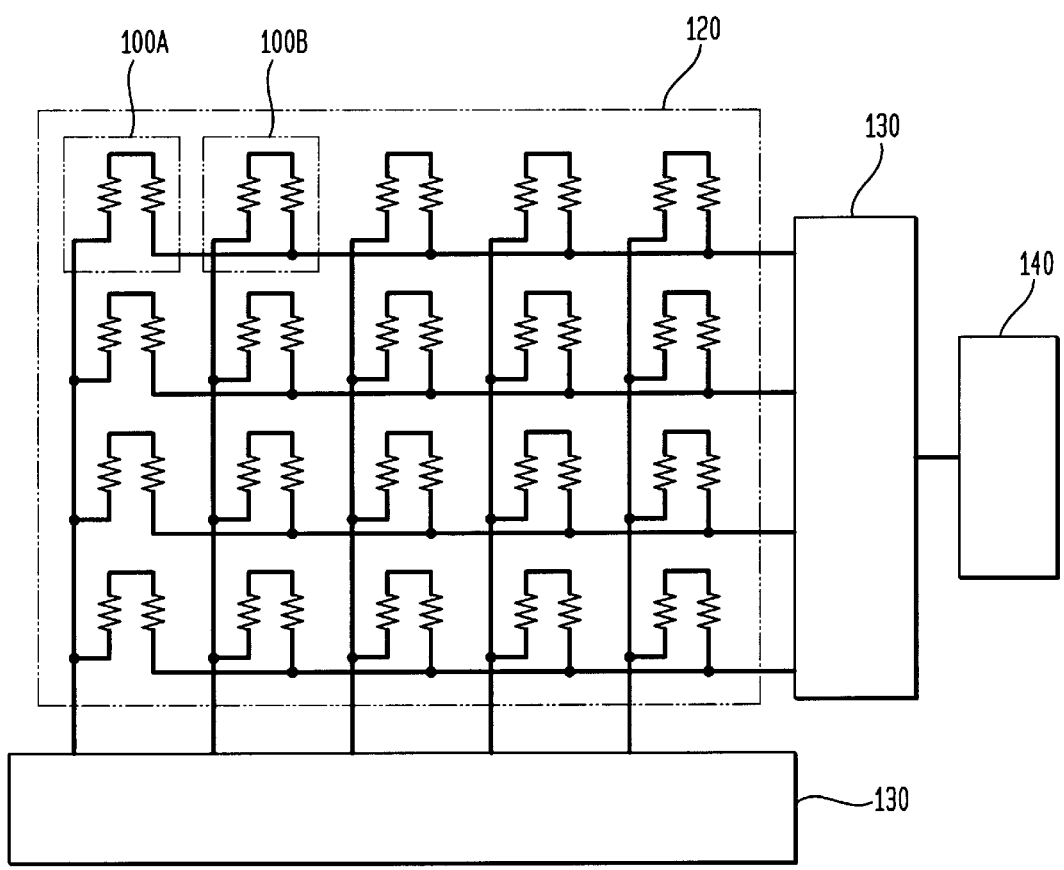
FIG. 4 is an array of sensing cells according to the present invention including circuitry for controlling the sensing array.

FIG. 4 illustrates an array 120, of a plurality of sensing cells (only the sensing element 40 in each of the plurality of sensing cells is shown for simplicity) and peripheral circuitry such as an addressing circuit 130 and a signal processing unit 140, according to an alternate embodiment of the present invention. The addressing circuit 130 is used to scan selectively the output characteristic (e.g., resistance or voltage) of the each of the sensing cells 100 in the plurality of sensing cells. In operation, the output of each individual sensing cell 100 in the plurality of sensing cells, can be scanned and stored in the signal processing unit 140 (e.g., a microprocessor) prior to applying a force. Thereafter, the force is applied and maintained while each sensing cell 100 in the plurality of sensing cells, is again scanned.

For the force to be sensed, the force must be applied to one or more sensing cell 100, of the sensing array 120. The difference between the output response (e.g., resistance) in the plurality of sensing cells before the force is applied, and the output response in the plurality of sensing cells while the force is applied, is proportional to the amount of force applied to the sensing array 120. If there is no change in the output response of the sensing element 40 in the plurality of sensing cells, then no force was sensed by the sensing cell 100.

Further, a variation in differences among a sensing cell 100A and a sensing cell 100B, for instance, in the plurality of sensing cells, is proportional to, and indicative of, the distribution of the applied force with respect to the sensing cells 100A and 100B.

A preferred fabrication procedure for the sensor array 120 is now briefly described. The peripheral circuitry which consists of the addressing circuit 130 and the signal processing unit 140 are fabricated first using standard CMOS VLSI technology. The sensing element 40 for each sensing cell 100 in the plurality of sensing cells, is also fabricated during this CMOS processing by ion implantation and annealing. The sensing bump 30, for each sensing cell 100 in the plurality of sensing cells, is formed on the silicon bridge 10 during the patterning of the various CMOS processing steps.

After the completion of the standard CMOS processing, the wafer is patterned by photolithography to expose the trench areas of the sensor and etched to the silicon surface. A masking layer (e.g., a silicon oxide) is then deposited and patterned.

The recessed area 20, for each sensing cell 100 in the plurality of sensing cells, is then etched vertically using the patterned mask. The next step is to deposit a thin layer of passivation material (e.g., silicon dioxide) and etch anisotropically to form a sidewall spacer on the recessed area 20, for each sensing cell 100 in the plurality of sensing cells. A continuous silicon etch, anisotropically and then isotropically, will laterally undercut the silicon and release it from the silicon in the surrounding area 25 to form the bridge 10 and the recessed area 20, for each sensing cell 100 in the plurality of sensing cells.

CONCLUSION

A tactile sensor is disclosed which can accurately. determine small variations in an applied force. The sensor can be fabricated during standard CMOS processing and can therefore be readily integrated with peripheral circuitry onto a single IC. The tactile sensor may be variably sized to accommodate a specific application including a dense sensor array. Further, the tactile sensor of the present invention is reliable, stable and can accurately determine the magnitude of an applied force.

While the invention has been described with reference to the preferred embodiments, it will be apparent to those skilled in the art that numerous variations can be made without departing from the spirit or scope of the invention which is defined by the appended claims. The preferred embodiments were described above solely for illustrative purposes and were not intended to limit the metes and bounds of the appended claims.

The claimed invention is:

1. An apparatus for sensing an applied force comprising:
   a deflectable bridge formed in a substrate and spanning a recess in the substrate; and
   a sensing element formed on the bridge and responsive to deflection of the bridge.

2. The apparatus of claim 1, further comprising a sensing bump connected to said bridge and configured to receive said applied force.

3. The apparatus of claim 2, wherein said sensing bump is configured to optimize the deflection of said bridge in response to said applied force.

4. The apparatus of claim 1, wherein said sensing element is comprised of a piezoresistor network.

5. The apparatus of claim 4, wherein said piezoresistor network is further comprised as a Wheatstone bridge circuit.

6. The apparatus of claim 1, wherein said sensing element is comprised of a MOS transistor.

7. The apparatus of claim 1, wherein said bridge having a first surface and a second surface, further comprises a bore passing through said bridge from said first surface to said second surface.

8. The apparatus of claim 1, wherein said sensing element is formed by P+ implantation.

9. The apparatus of claim 2, wherein said sensing bump is formed by at least one of metal, polysilicon, dielectric and passivation layers.

10. The apparatus of claim 1, wherein said apparatus is CMOS compatible.

11. An apparatus for sensing an applied force comprising a plurality of sensing cells, wherein each sensing cell in said plurality of sensing cells is comprised of:
    a deflectable bridge formed in a substrate and spanning a recess in the substrate; and
    a sensing element formed on the bridge in said plurality of sensing cells wherein said sensing element is responsive to deflection of the bridge in said plurality of sensing cells.

12. The apparatus of claim 11, wherein each said bridge in said plurality of sensing cells further comprises a sensing bump connected to said bridge and configured to receive said applied force.

13. The apparatus of claim 12, wherein said sensing bump is configured to optimize the deflection of said bridge in said plurality of sensing cells in response to said applied force.

14. The apparatus of claim 11, wherein each said sensing element in said plurality of sensing cells is comprised of a piezoresistor network.

15. The apparatus of claim 11, wherein each said sensing element in said plurality of sensing cells is comprised of a MOS transistor.

16. The apparatus of claim 11, wherein each said bridge in said plurality of sensing cells has a first surface, a second surface, and a bore, said bore passing from said first surface to said second surface.

17. The apparatus of claim 11, wherein said apparatus is CMOS compatible.

18. A method for sensing an applied force comprising the steps of:
deflecting a bridge spanning a recess in a semiconductor substrate;
sensing said deflection of said bridge; and
producing a signal in response to said sensing of said deflection of said bridge, wherein said signal is in proportion to said deflection.

19. The method of claim 18, wherein said step of deflecting said bridge further comprises the step of applying said force to said bridge through a sensing bump.

20. The method of claim 19, wherein said step of deflecting said bridge further comprises the step of configuring said sensing bump to optimize said deflection of said bridge.

21. The method of claim 18, wherein said step of sensing said deflection of said bridge is further comprised of providing a piezoresistor network for said sensing.

22. The method of claim 18, wherein said step of sensing said deflection of said bridge is further comprised of providing a MOS transistor for said sensing.

23. A method for fabricating a sensing cell for sensing an applied force comprising the steps of:
forming a deflectable bridge spanning a recess in a semiconductor substrate;
forming a sensing element responsive to deflection of the bridge.

24. The method of claim 23, further comprising the step of forming a sensing bump on said bridge, said sensing bump configured to receive said applied force.

25. The method of claim 24, wherein said step of forming said sensing bump on said bridge further comprises configuring said sensing bump to optimize said deflection of said bridge in response to said applied force.

26. The method of claim 23, wherein said step of forming said sensing element further comprises forming said sensing element as a piezoresistor network.

27. The method of claim 23, wherein said step of forming said sensing element further comprises forming said sensing element as a MOS transistor.

28. The method of claim 23, wherein said step of forming said sensing bump further comprises forming said sensing bump by at least one of metal, polysilicon, dielectric and passivation layers.

29. The method of claim 23, further comprising selecting said method to be CMOS compatible.

30. The method of claim 29, wherein said step of forming said deflectable bridge is further comprised of performing a continuous etch anisotropically and then isotropically, to laterally undercut said bridge, form said recess, and release said bridge from said semiconductor substrate.

* * * * *